United States Patent
Knox

(10) Patent No.: US 7,424,973 B2
(45) Date of Patent: Sep. 16, 2008

(54) PREPAID BROADBAND INTERNET AND SOFTWARE SERVICE METHOD AND APPARATUS

(75) Inventor: David Knox, Point Roberts, WA (US)

(73) Assignee: Datawave Systems, Inc., Vancouver, BC (CA)

(*) Notice: Subject to any disclaimer, the term of this patent is extended or adjusted under 35 U.S.C. 154(b) by 1479 days.

(21) Appl. No.: 10/134,211

(22) Filed: Apr. 29, 2002

(65) Prior Publication Data

US 2003/0204443 A1 Oct. 30, 2003

(51) Int. Cl.
*G06K 5/00* (2006.01)
(52) U.S. Cl. ........................ 235/382; 235/380
(58) Field of Classification Search .......... 235/493, 235/486, 487, 492, 449, 380, 375, 382, 382.5; 705/14, 27, 16, 38; 455/406, 407
See application file for complete search history.

(56) References Cited

U.S. PATENT DOCUMENTS

| | | | |
|---|---|---|---|
| 5,467,398 A * | 11/1995 | Pierce et al. ............... | 380/44 |
| 5,749,075 A | 5/1998 | Toader et al. | |
| 5,774,869 A | 6/1998 | Toader | |
| 5,933,498 A | 8/1999 | Schneck et al. | |
| 5,956,697 A | 9/1999 | Usui | |
| 6,055,314 A | 4/2000 | Spies et al. | |
| 6,128,601 A | 10/2000 | Van Horne et al. | |
| 6,169,975 B1 | 1/2001 | White et al. | |
| 6,192,132 B1 | 2/2001 | Chavez, Jr. et al. | |
| 6,298,336 B1 | 10/2001 | Davis et al. | |
| 6,343,284 B1 | 1/2002 | Ishikawa et al. | |
| 6,745,022 B2 * | 6/2004 | Knox .................... | 455/406 |
| 7,103,570 B1 * | 9/2006 | Morea et al. ............. | 705/38 |
| 2003/0204443 A1 * | 10/2003 | Knox ..................... | 705/14 |
| 2004/0182940 A1 * | 9/2004 | Biller ..................... | 235/493 |

* cited by examiner

*Primary Examiner*—Thien M Le
(74) *Attorney, Agent, or Firm*—Jon A. Gibbons; Fleit Gibbons Gutman Bongini & Bianco P.L.

(57) ABSTRACT

A prepaid computer service operating on a personal computer and a networked computer is activated at a point of sale. The service includes broadband Internet access such as DSL. The service running on the personal computer includes a switch for discontinuing the service upon expiration of the prepaid service. The switch may be a comprised in a circuit interconnected between a DSL modem and a personal computer. A DSL service provider provides Internet access service and a service manager manages the prepaid service. The switch has a timer having a value loaded by the service manager, and the timer is used to determine the expiration of service. The prepaid service alternately includes a software based switch which may be used to regulated prepaid internet service or other software based services such as prepaid Internet based games, thin-client software services or entertainment.

20 Claims, 7 Drawing Sheets

US 7,424,973 B2

PREPAID BROADBAND INTERNET AND SOFTWARE SERVICE METHOD AND APPARATUS

PARTIAL WAIVER OF COPYRIGHT

Copyright, 2002, DataWave® Systems Inc., all rights reserved. A portion of the disclosure of this patent document contains material which is subject to copyright protection by the laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

This invention relates generally to a prepaid service operating on a computer network and more particularly to a prepaid service partially implemented on a personal computer and partially implanted on another networked computer.

BACKGROUND OF THE INVENTION

Prepaid services are becoming a widely accepted form of service provision. Prepaid services have the advantage of simplifying service provision and billing. An example is prepaid long distance telephone service. A customer buys a prepaid long distance card at a retail point of sale. The prepaid card provides the purchaser with predetermined number of long distance telephone minutes at a predetermined price. As a theft deterrent, the card is activated at the time of sale. Thereafter the customer follows the long distance phone dialing instructions on the prepaid card to utilize the prepaid long distance telephone service.

Prepaid services have advantages over other more conventional methods of service provision. For example, the customer may be anonymous, thereby maintaining privacy. A customer need not provide personal identification to acquire a prepaid service. For another example, the cost of the service is predictable. Since the service is prepaid, the customer need not worry about the cost of the service becoming unexpectedly excessive. No customer billing by the service provider is necessary and the customer receives no surprise bills. Consequently, prepaid services are an effective tool for managing a budget of a customer. Furthermore, since the prepaid service provider need not administer customer collections or customer contracts, prepaid service is an effective service distribution tool for service providers.

Internet service, particularly high speed broadband Internet service, can be an expensive proposition for the occasional customer. Such Internet service includes cable or DSL and typically requires a long-term contract with the service provider. Presently, monthly billing averages around fifty dollars per month. While customers may prefer the service, occasional use of the service weighed against the cost may prove undesirable to certain customers. In this case a customer may allow an existing service contract to expire. Thereafter, the customer is left with an established broadband connection to the Internet service provider and a working modem for interfacing with the Internet service provider. However, the customer's use may be so occasional as to not warrant continuing the contract or a billing relationship. Thus, the occasional customer is left without broadband Internet service even though the customer has the equipment to readily interface with the broadband Internet service provider.

Similar problems arise in other areas of personal computer use. For example, a customer may want to occasionally play an Internet enabled computer game without paying full price for a fully enable gaming software package. Similarly, a provider of such a gaming software package may desire protection against theft of services. Alternately, a thin client service provider allows a client's personal computer to utilize programs operating on service a provider's servers. However, if a client's use is occasional, establishing a contact and billing cycle between the user and service provider may not be warranted.

Thus, what is needed is a method and apparatus that addresses the advantages of prepaid services while resolving the problems of providing services partially implemented on a personal computer and partially implemented on another networked computer.

DETAILED DESCRIPTION OF THE INVENTION

Figure 1:
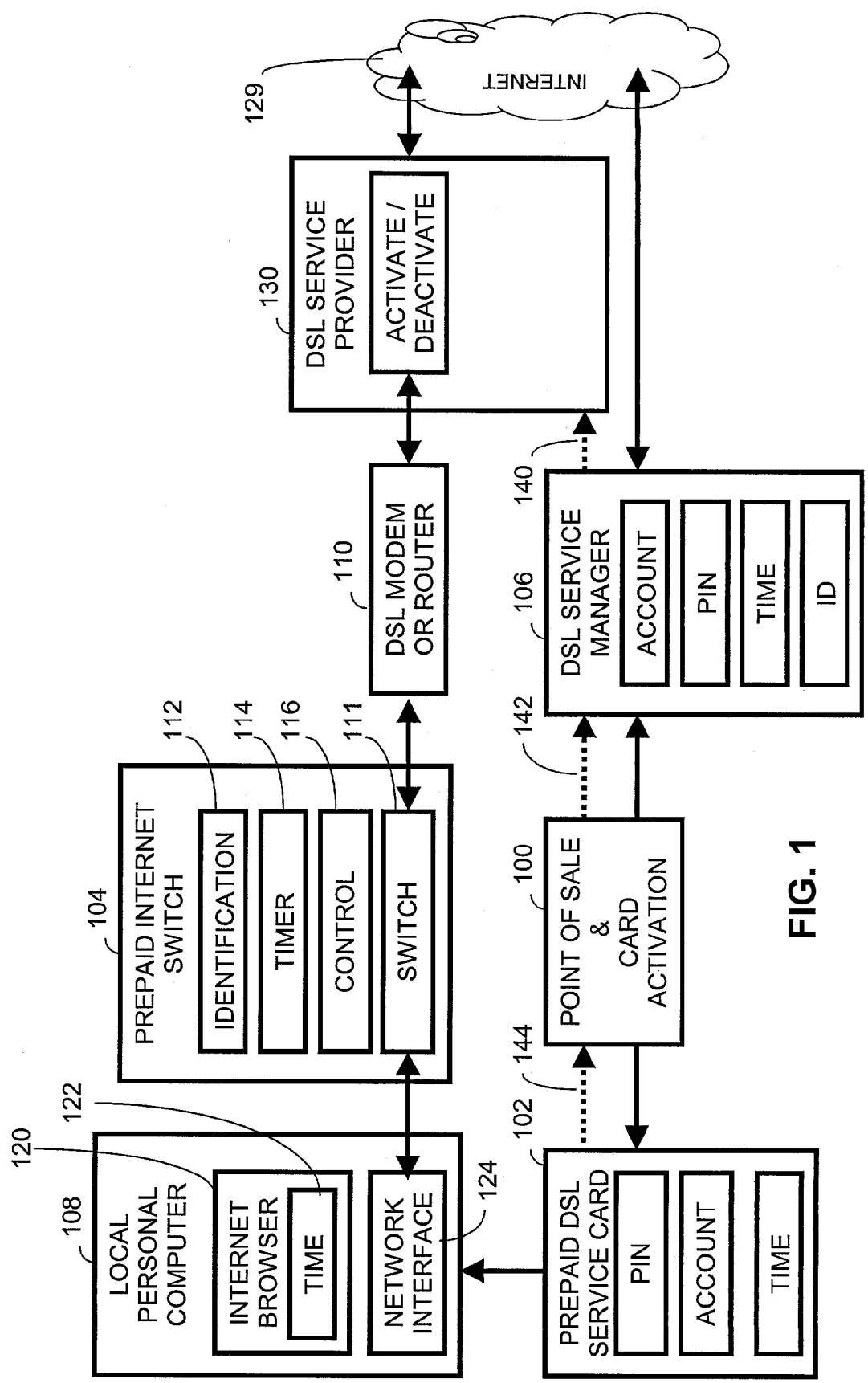
FIG. 1 shows a block diagram of a prepaid DSL Internet service system in accordance with a first embodiment of the present invention.

FIG. 1 shows a block diagram of a prepaid DSL Internet service system in accordance with the present invention. At point of sale 100, a prepaid DSL Internet service card 102 and a prepaid Internet service switch 104 are offered for sale. The point of sale may be any retail outlet, catalog sales facility, Internet web page sales facility or other operation facilitating sales transactions. Preferably, the point of sale is a retail outlet equipped to market other prepaid services such as prepaid long distance services. The prepaid DSL service card 102 is preferably sold in combination with the prepaid Internet switch for initial establishment of service. Also, the prepaid DSL service card 102 is sold separately without the prepaid Internet switch 104. Being sold separately facilitates "recharging" or purchasing of additional Internet service beyond the initial establishment of service. The prepaid card has a time indicating an amount of Internet access provided. The prepaid card also has an account number used to identify the card and a pin number to deter against theft of a purchased card. The prepaid card or its packaging has a bar code or other signal for communication of the account number and a quantity and type of service purchased. This signal it is sent at the point of sale in response to the sale of the card. During activation, an electronic signal indicative of the account number and completion of the sales transaction is sent to the DSL service manager 106. Since the card 102 has no effective value prior to activation, the activation step deters theft or other improper transfer of prepaid card services prior to its sale.

After the purchase, the consumer installs the prepaid Internet switch. Preferably the consumer already has a local personal computer 108 and a DSL modem or router 110. Preferably the interface between the personal computer 108 and the modem is an Ethernet interconnect using RJ45 connectors. The prepaid Internet switch has two RJ45 connectors and an additional cable for coupling between the personal computer and the modem. Thus, the consumer simply disconnects the RJ45 connector from the modem, connects it to the prepaid Internet switch and installs a new cable between the prepaid Internet switch and the modem. In alternative embodiments other couplings between the personal computer and router are anticipated and include universal serial bus (USB), firewire, serial, parallel and other types of couplings known to those familiar with the art.

Prepaid Internet switch 104 has a switch 111 for enabling and disabling the coupling between the personal computer and the modem. Also included is an optional identification signal 112 for uniquely identifying the prepaid Internet switch. A timer 114 determines how much Internet access time remains. Control function 110 coordinates operation of the functions of the prepaid Internet switch, manages communication between the local personal computer, modem and the DSL service manager. Preferably the functions of the prepaid Internet switch are implemented by a firmware controlled microcomputer and supporting integrated circuits or application specific integrated circuits (ASICs), and the switch appears as a small package having two RJ45 connectors.

The local personal computer 108 has an Internet browser 120 for interfacing with the Internet 129. Optional time display 122 provides an indication of the remaining time available for prepaid Internet access. Also included is a network interface 124 for providing the personal computer with an Ethernet interface.

Figure 2:
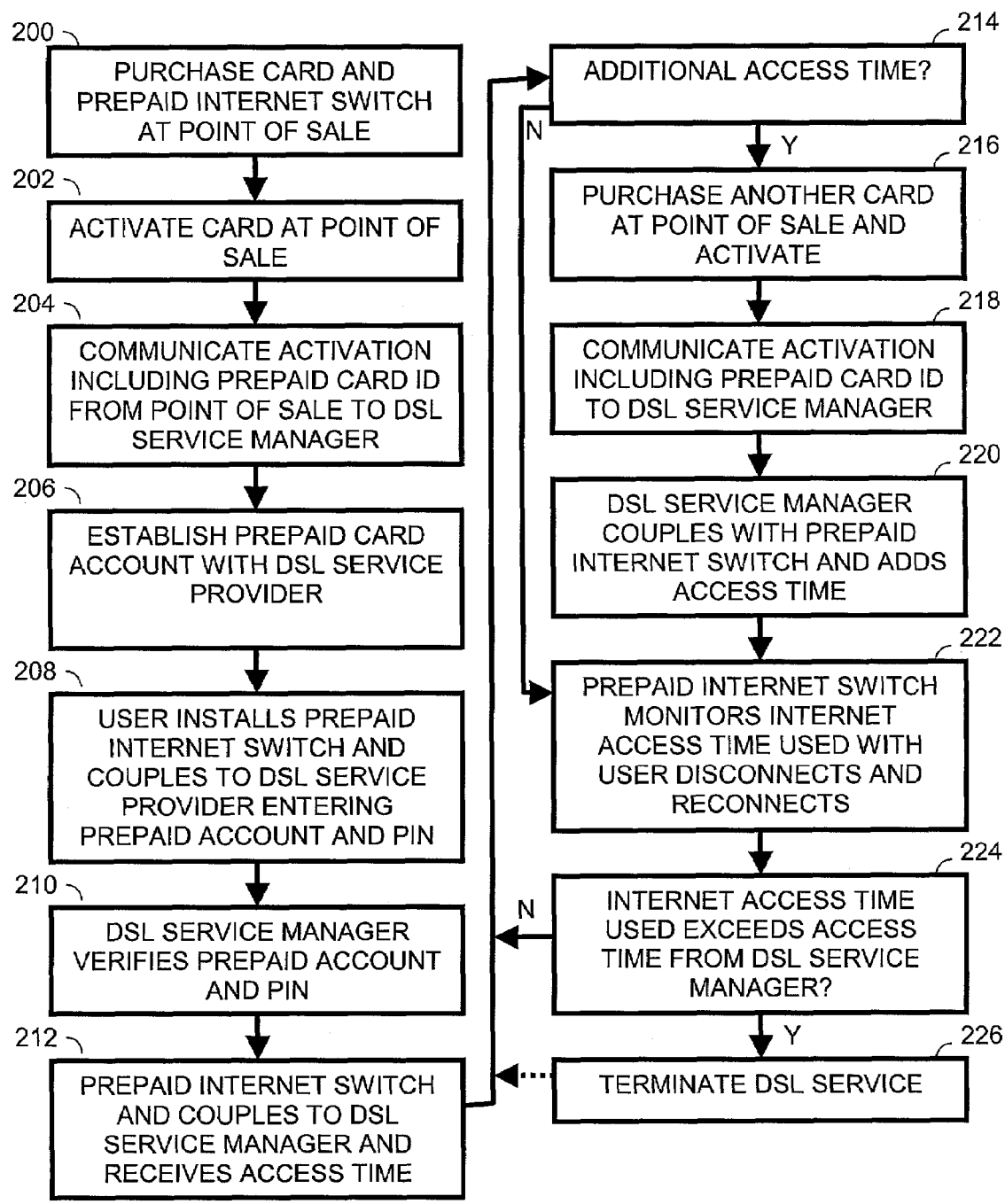
FIG. 2 shows an overall flow diagram for establishing and maintaining a prepaid DSL account in accordance with the first embodiment of the present invention.

FIG. 2 shows an overall flow diagram for establishing and maintaining a prepaid DSL account in accordance with the present invention. The following discussion refers to FIG. 1 and FIG. 2 concurrently. At step 200, a prepaid card 102 and prepaid switch 104 are purchased at a point of sale 100. At step 202 card 102 is activated at the point of sale, the activation signal from the point of sale assures that the customer has paid for the service before it is made available. At step 204 a signal indicative of the account number and time of the prepaid card is communicated from the point of sale 100 to DSL service manager 106.

At step 206 an Internet account is established with the DSL service provider 130. This may be done in several ways. If the custom has an existing DSL account with the DSL service provider then the responsibility of billing of the account is transferred to the DSL service manager. The phone number or account information of the customer is provided to the DSL service manager identifying the line of customer coupled to the DSL modem. The DSL service manager then communicates the account change information to the DSL service provider. Alternatively, the customer could provide the account change information to the DSL service manager and the DSL service manager provide the DSL service provider with account activation information. If the customer does not have an existing account, that is no account had ever been open, then new DSL service would be established. Alternately, the customer may have allowed an existing prepaid or non-prepaid account to lapse. In either case, the DSL service provider would receive the phone number of the customer in order to couple to the DSL modem. Furthermore, the DSL service provider would be informed that the DSL service manager would be responsible for billing. This information would either be provided to the DSL service provider by the customer directly, or if the customer provides such information to the DSL service manager, then the DSL service manager would provide the information to the DSL service provider. It is also desirable that the DSL service provider and the DSL service manager have a preexisting relationship to provide prepaid DSL Internet service.

At step 208, the user installs the prepaid Internet switch 104 and couples to the DSL service provider 130 and optionally provides the account and PIN. The DSL service provider 130 activates or deactivates the user's individual account in response to activation and deactivation signals from the DSL service manager 106. At step 210 the user couples to the web page of the DSL service manager and provides the account number and PIN of the prepaid card. Then at step 212 the prepaid Internet switch optionally communicates its identification signal. In response to verification of the account and PIN of step 210 the prepaid Internet service manager sends the allotted Internet access time to the prepaid Internet switch. If at step 214 no additional time is being purchased, then at step 222 the prepaid Internet switch facilitates Internet access and monitors the Internet access time used. During this time the user may disconnect from or reconnect to the Internet. The switch may track the connection time by connection activity. For example, if the user purchased one thousand hours of prepaid Internet service, then every hour the user spent connected to the Internet would decrement the time. Alternatively, the customer could purchase and the system could track an amount of data transferred in place of time, or a combination of both. Step 224 determines if the amount of time of Internet access exceeds the amount of time of the prepaid card communicated to the switch at step 212. If so, Internet service is terminated by decoupling the modem 110 from the personal computer 108 using switch 111.

In the preferred embodiment, the Internet browser 120 is able to display the amount of time remaining 122 of the prepaid Internet service. Thus, when the prepaid Internet service is about exhausted, the user may purchase an additional card at the point of sale. At step 216 another prepaid DSL service card is purchased and activated at the point of sale. The activation is communicated to DSL service manager at step 218. Step 220 communicates the additional time from the DSL service manager to the prepaid Internet switch and Internet service is maintained.

It should be appreciated that several enhancements of the invention are possible by those familiar with the art. For example, a routine could be loaded into the personal computer assuring installation of the prepaid Internet switch 104 in order to provide Internet service. The routine could be downloaded from the web page of the DSL service manager or included on a disk with the purchase of the prepaid Internet switch. Alternately, the DSL service manager could periodically ping the prepaid Internet switch for its presence while the is were connected to the Internet. Furthermore, the prepaid Internet switch, upon determining the eminent termination of the service by the switch could send a termination signal to the DSL service manager that would then signal the DSL service provider to terminate service its connection to the DSL modem of the user.

Figure 3:
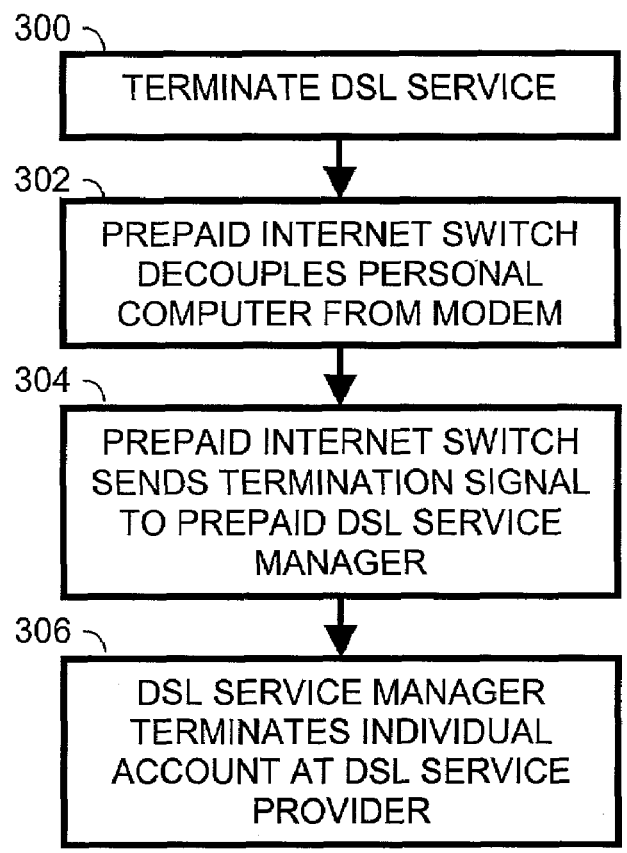
FIG. 3 shows a more detailed flow diagram of the termination of service in accordance with the present invention.

FIG. 3 shows a more detailed flow diagram of the termination of service in accordance with the present invention. Step 300 corresponds to entry of step 226 of FIG. 2. When DSL service is terminated the prepaid Internet switch decouples the personal computer from the DSL modem. This is performed by inhibiting the flow of at least some of the signals between the personal computer and the modem at step 304. The prepaid Internet switch may then optionally send at termination signal to the service manager indicating that the prepaid time has lapsed and that the switch is terminating the service. In response the DSL service manager sends a signal to the DSL service provider to terminate the account, at step 306. It should be noted that even though Internet service may be immediately terminated, the account termination signal may be delayed for a period of time, thirty days for example, in order to give the user time to purchase additional prepaid Internet time. In this mode, the prepaid Internet switch would limit Internet access to the web pages provided by the DSL service manager in order to facilitate the purchase and/or registration of additional prepaid time using the Internet.

Figure 4:
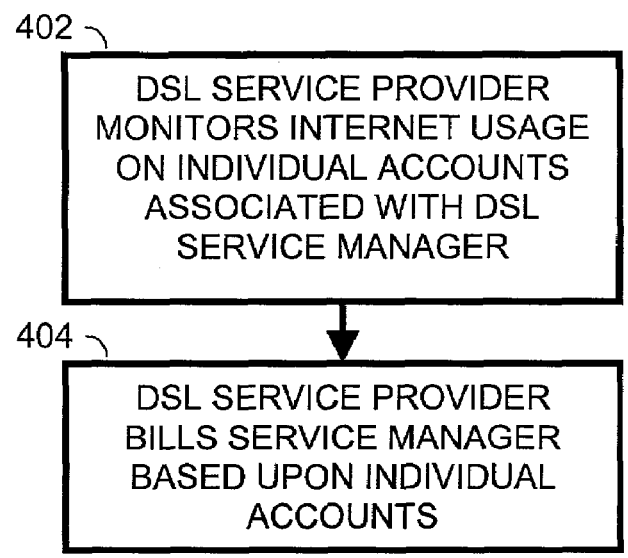
FIG. 4 shows a method for billing between the DSL service provider and the DSL service manager in accordance with the present invention.

FIG. 4 shows a method for billing between the DSL service provider and the DSL service manager in accordance with the present invention. In step 402 the DSL service provider monitors the Internet usage on the basis of individual accounts associated with the prepaid DSL service manager. The billing may be based upon the connection time between the DSL service provider and the customer's modem, and/or upon the amount of data communicated between the modem and the DSL service provider. Then in step 404 the DSL service provider bills the DSL service manager on the basis of the total time, total data communicated or a combination of both provided to all accounts associated with the DSL service manager.

The DSL service provider preferably also provides contracted Internet service to other non-prepaid users. In this combined service provision, the DSL service provider realizes the benefit of extra revenue of the occasional prepaid Internet user without the burden of contracts and collections. This is because the service is paid for by the DSL service manager, as indicated by the dashed line 140 of FIG. 1. The DSL service provider monitors the Internet usage by a preferably large number of prepaid Internet customer and bills the DSL service manager, rather than each customer individually. The DSL service manager receives compensation from point of sale, see dashed line 142 of FIG. 1 who receive prepaid compensation from the customers by the sale of the prepaid DSL service, see dashed line 144 of FIG. 1. The DSL service manager has the security of the prepaid Internet switch to assure that prepaid customers do not exceed the amount of purchased prepaid Internet service and the security of point of sale activation to assure that the prepaid Internet service is not stolen or otherwise improperly obtained. Furthermore, customers have the convenience of not having to sign any long term or predefined contract to receive broadband Internet access.

Figure 5:
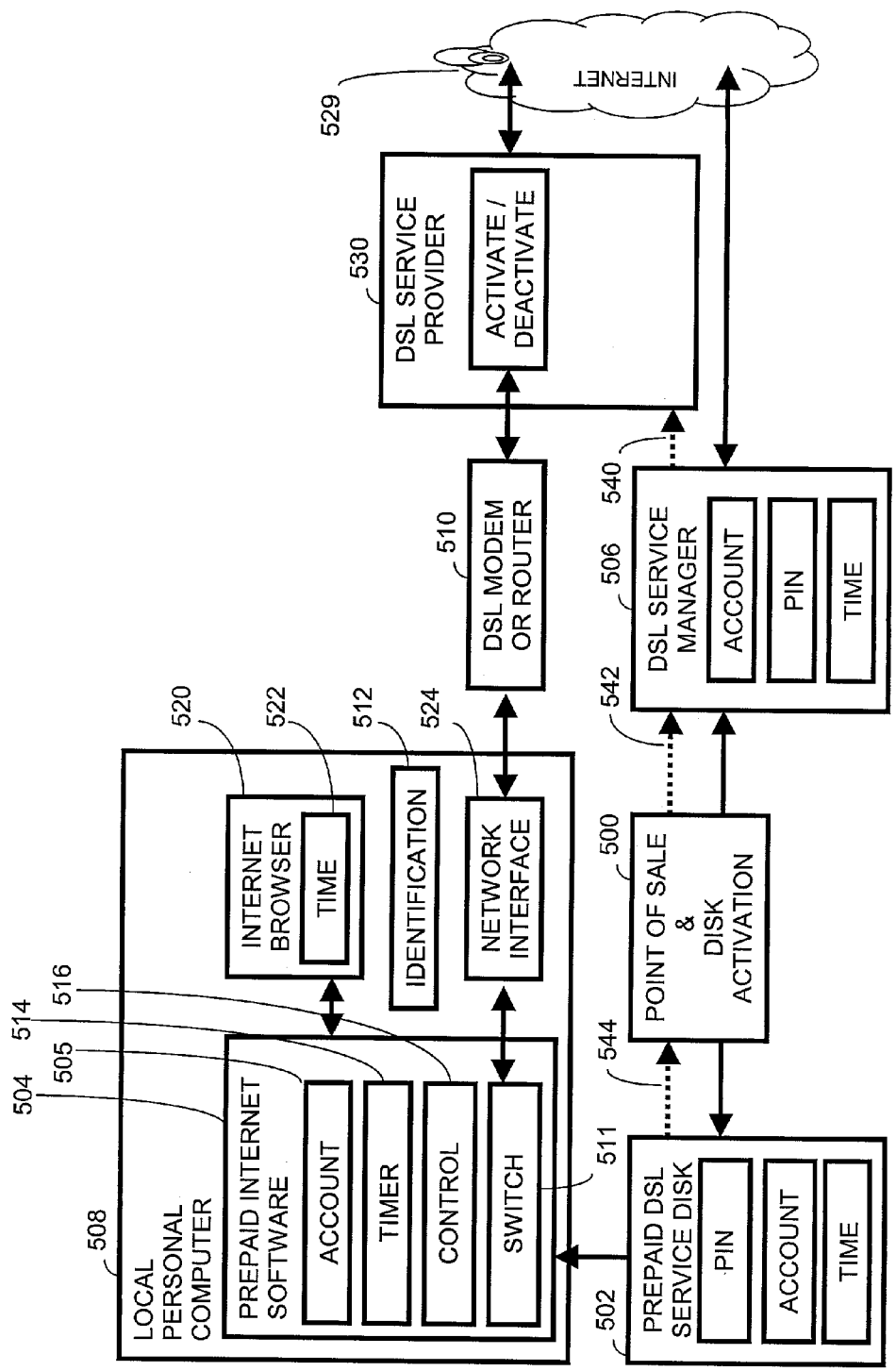
FIG. 5 shows an alternate system block diagram for a software based prepaid Internet service in accordance with a second embodiment the present invention.

FIG. 5 shows an alternate system block diagram for a software based prepaid Internet service in accordance with a second embodiment the present invention. The system operates similarly to the system of FIG. 1 except that the functions of the prepaid Internet switch 104 and prepaid DSL service card 102 are incorporated into a computer disk 502. Point of sale 500 sells a prepaid DSL service disk 502. The disk may be a compact disk, a mini compact disk, diskette or other computer readable media such as a memory card. Imprinted on the disk is an account number, a pin number and an amount of Internet access time provided by the purchase of the disk. The disk also includes computer instructions and data 504 for implementing functions of the prepaid Internet switch 104 of FIG. 1 for installation on personal computer 508. Internet browser 520 includes a timer 522 for indicating an amount of prepaid time remaining. The browser interfaces to the Internet 529 through the prepaid Internet software 504 and its network interface 524 installed upon personal computer 508 which is coupled to DSL modem or router 510 and DSL service provider 530. The DSL service manager 506 is also coupled to the Internet 529 providing communication with the DSL service provider 530 and the prepaid Internet software 504 operating on the personal computer 508.

The prepaid Internet software has a timer 514 for determining the amount of time a user accesses the Internet and comparing the time to the amount of prepaid Internet time purchased. Control processor 516 coordinates the functions of the prepaid Internet software and further communicates with the DSL service manager 506. Communications include recharging of prepaid Internet time and establishment and termination of prepaid Internet services. The account number associated with the disk 502 is also included as a data element and communicated to the DSL service manager.

Figure 6:
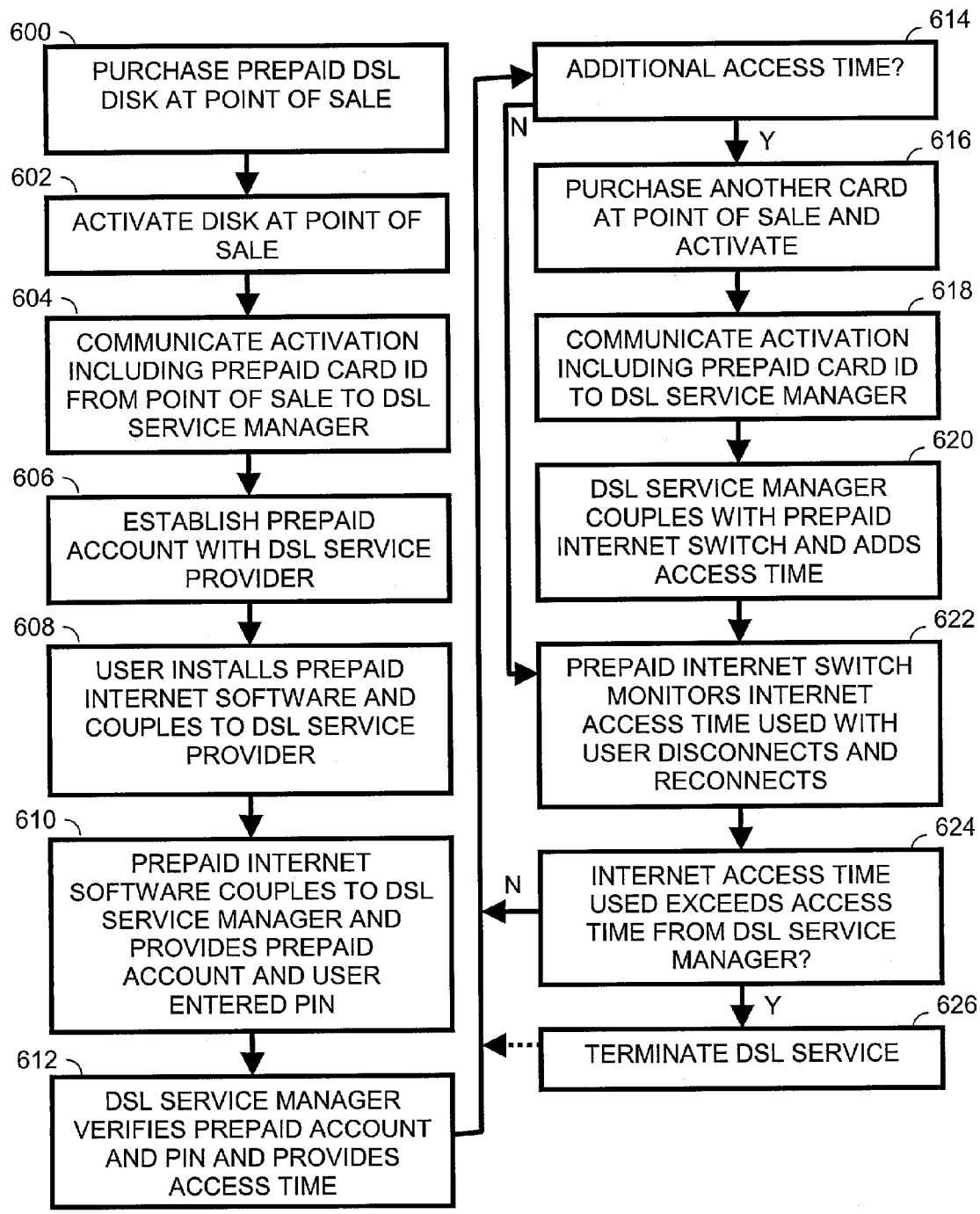
FIG. 6 shows an overall flow diagram for establishing and maintaining a prepaid DSL account with a prepaid DSL disk in accordance with the present invention.

FIG. 6 shows an overall flow diagram for establishing and maintaining a prepaid DSL account with a prepaid DSL disk in accordance with the second embodiment of the present invention. The following discussion refers to FIG. 5 and FIG. 6 concurrently. At step 600, a prepaid disk 502 is purchased at a point of sale 500. At step 602 the disk is activated at the point of sale, the activation signal from the point of sale assures that the customer has paid for the service before it is made available. Activation may occur by scanning a bar code imprinted on the disk or its packaging, the bar code indicating the account number and amount of service provided by the purchase. At step 604 a signal indicative of the account number and time of the prepaid disk is communicated to DSL service manager 506. Note that since the disk itself has data indicative of the time signal that may be communicated directly to the DSL service manager using the personal computer coupled to the Internet, the communication of the time signal during activation is optional.

Similar to step 206 of FIG. 2, at step 606 an Internet account is established with the DSL service provider 530. At step 608, the user installs the prepaid Internet software and couples to the DSL service provider 530 using the established account and optionally provides the account and PIN. The PIN is preferably provided in such a way that it is not readily obtainable prior to purchasing the card in a manner known to those familiar with the art. For example, the PIN may be printed on an obscure surface or concealed by a "scratch-off" covering. The DSL service provider 530 activates or deactivates the user's individual account in response to activation and deactivation signals from the DSL service manager 506. At step 610 the software couples to the web page of the DSL service manager and provides the account number and user entered PIN of the disk. Then at step 612 the prepaid Internet service manager send the allotted Internet access time to the prepaid Internet software. If at step 614 no additional time is being purchased, then at step 622 the prepaid Internet software monitors the Internet access time used. During this time the user may disconnect from or reconnect to the Internet. The switch may track the connection time by connection activity. If the user purchased one thousand hours of service, then every hour the user spent connected to the Internet would decrement the time. Alternatively, the system could track an amount of data transferred in place of time, or a combination of both. Step 624 determines if the amount of time of Internet Access exceeds the amount of prepaid time communicated at step 612. If so, Internet service is terminated by decoupling the Internet browser from the Internet 529 using switch 511. This may be done by sending a command to the modem 510 to disconnect from the DSL service provider, or block communications between DSL modem and other programs operating within the personal computer 508, including the browser 520.

Preferably, the Internet browser 520 is able to display the amount of prepaid time remaining 522. Thus, when the prepaid Internet service is about exhausted, the user may purchase an additional prepaid time at the point of sale at step 614. At step 616 another prepaid DSL service disk is purchased and activated at the point of sale. The activation is communicated to DSL service manager at step 618. Step 620 communicates the additional time from the DSL service manager to the prepaid Internet switch and Internet service is maintained. The prepaid Internet card of FIG. 1 may alternatively be used for the purchase of additional time in place of the prepaid disk.

Relative to the first embodiment, the embodiment of FIG. 5 and FIG. 6 has the additional advantage of providing prepaid Internet service without making additional hardware connections. Thus, the modem may be integrated into the personal computer or the modem may be either DSL, cable, POTS or other equivalent and prepaid service operation is substantially independent of the type of interface between the modem and the PC. Thus, the service may be any type of prepaid Internet access. The payment for Internet services is assured by financial transactions 540, 542 and 544 which correspond to financial transaction 140, 142 and 144 of FIG. 1. Furthermore, the step requiring activation of the initial disk when purchased and activation of the recharging disk or card serves as a deterrent against theft or other improper transfer prior to the sale and the PIN number acts as a deterrent against theft or other improper transfer from the purchaser.

Figure 7:
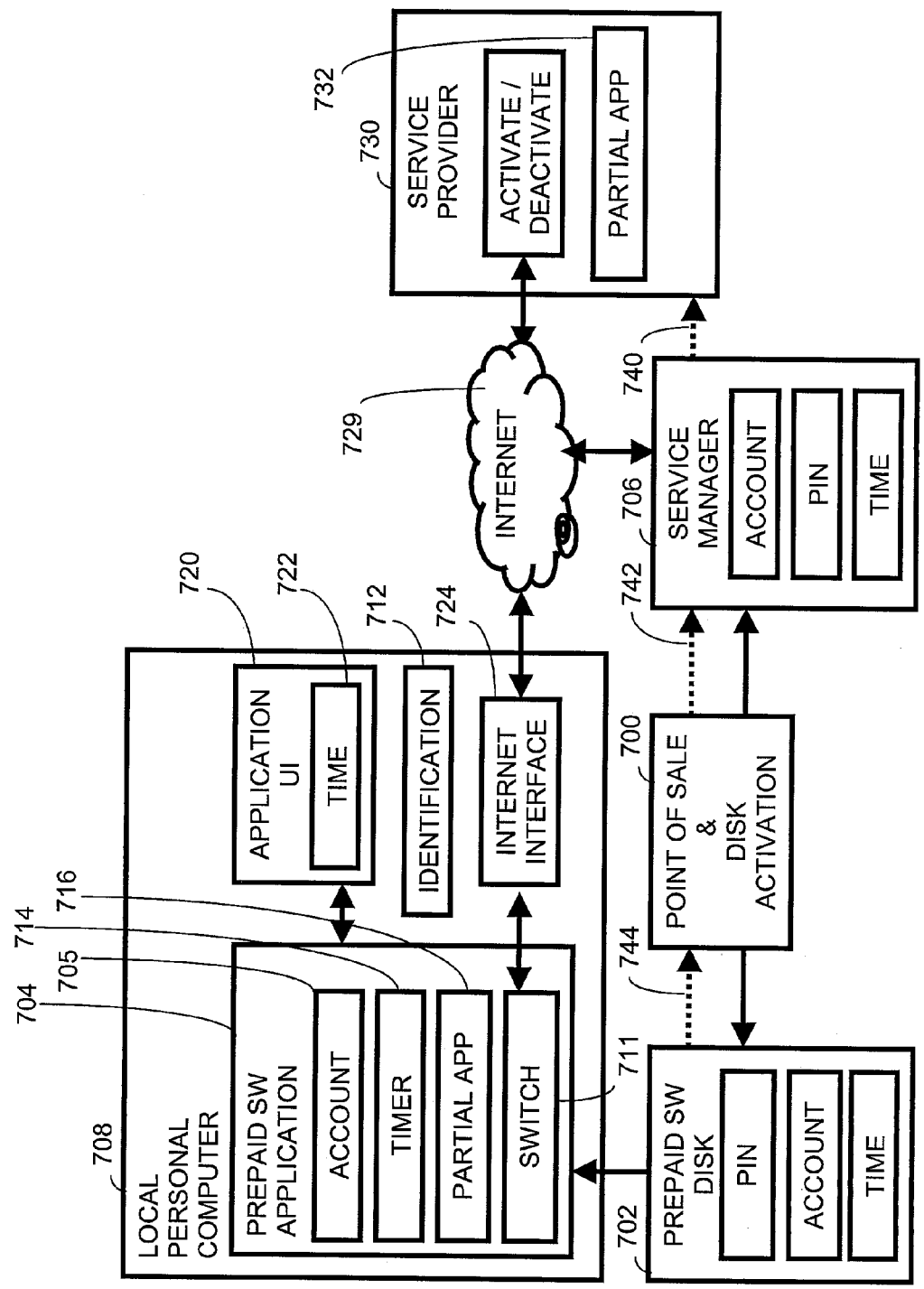
FIG. 7 shows a block diagram of a prepaid software distribution system operation in accordance with a third embodiment of the present invention.

FIG. 7 shows a block diagram of a prepaid software distribution system operation in accordance with a third embodiment of the present invention. A point of sale 700 sells a prepaid software (SW) disk 702. The disk includes packaging rights to limited operation of software included on the disk to be run on a personal computer 708 coupled to a service provider 730 through the Internet 729 or other network. For example, the disk may include the prepaid Internet service described with respect to FIG. 5 and FIG. 6. Or, a service may be a computer game played with other players via the Internet and the operation limited to one hundred hours of the game. Alternately, the disk may provide a thin client access to server based software such as word processing, graphic generation or other processing for a preset time. Or the disk may provide access to entertainment such as playing of video or audio programs provided over the Internet or other network in which case the disk could be marketed as a ticket to one or more movies or audio selections to be played on a personal computer or other device with network or Internet access.

The disk includes a partial application 716 of which the service provider has another component of the partial application 732. Together the partial applications combine to form a complete application. Other portions of the complete application may be distributed to other computers. For the computer game example, partial application 716 renders graphics for the game on the personal computer and receives character movements and game results from the service provider 730. Partial application 716 further receives game character movements from a user of the personal computer, some of which may be communicated to the service provider. The service provider partial application 732 receives game character movements from several personal computers and determines game results and communicates character movements and results to the partial applications of the several personal computers. In the movie viewer example, the disk provides access to an Internet movie broadcast service using an existing movie viewer such as Windows Media Player distributed by Microsoft or using a movie viewer included on the disk. Alternately, the movie itself may be substantially included on the disk, such as a DVD, with the service provider sending access codes to enable viewing of the movie on the personal computer and optionally providing certain information such as advertisements, or supplemental movie information such as recent actor and actress details or movie out-takes.

Figure 8:
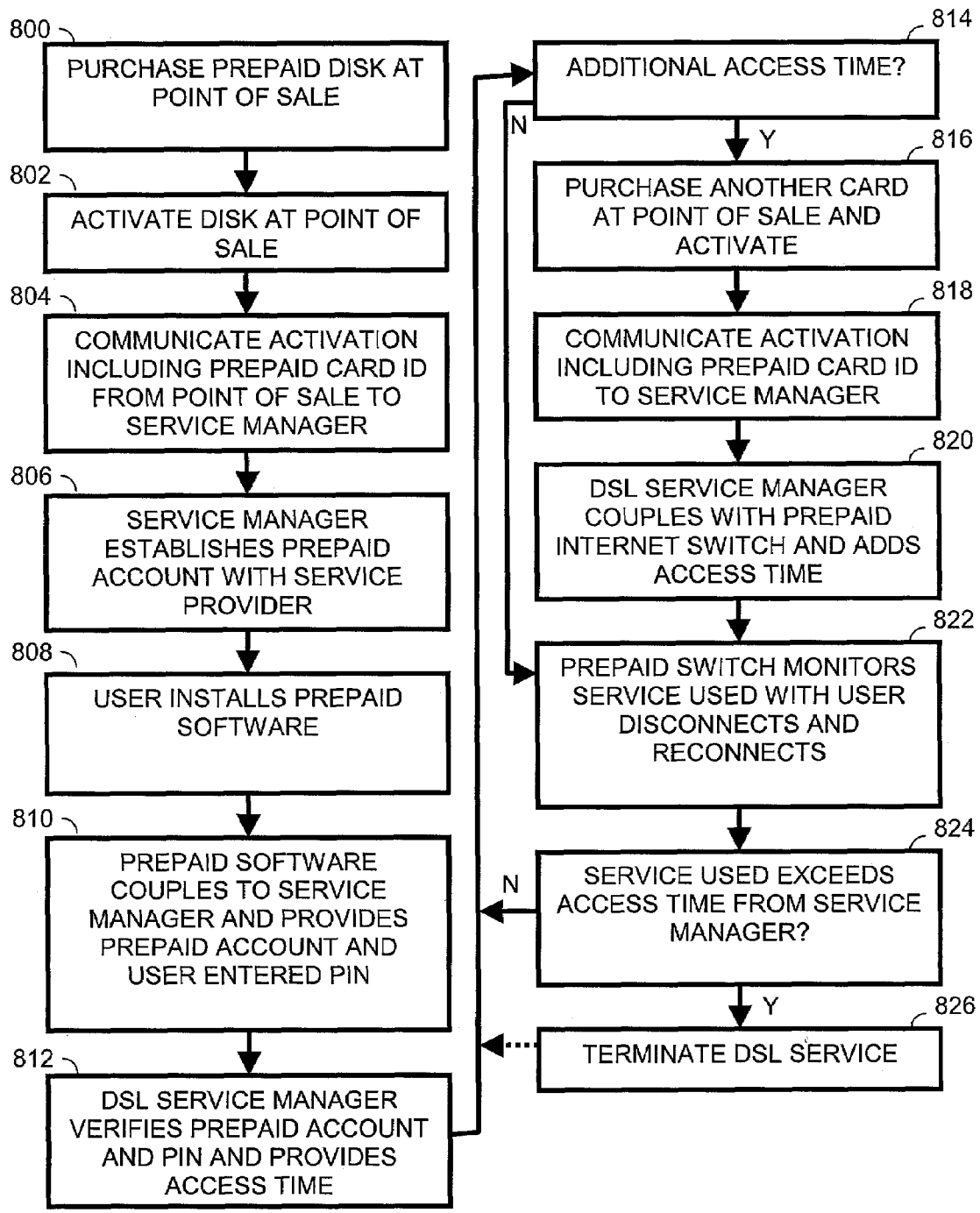
FIG. 8 shows an overall flow diagram for establishing and maintaining a prepaid software service with a prepaid disk in accordance with the third embodiment of the present invention.

FIG. 8 shows an overall flow diagram for establishing and maintaining a prepaid software service with a prepaid disk in accordance with the third embodiment of the present invention. The following discussion refers to FIG. 7 and FIG. 8 concurrently. At step 800, a prepaid disk 702 is purchased at a point of sale 700. At step 802, disk 702 is activated at the point of sale. As previously described, the activation signal from the point of sale assures that the customer has paid for the service before it is made available. Prior to activation, the software on the disk has little or no effective value because of it represents a portion of the service which is being purchased. At step 804 a signal indicative of the account number and amount of service or time associated with the prepaid disk is communicated to service manager 706. Note that since the disk itself has data indicative of the time signal that may be communicated directly to the service manager using the personal computer coupled to the Internet, the communication of the service amount or time signal during activation is optional.

At step 806, an account is established with the service provider 730. The account may be established directly by the service manager, since all necessary information such as the account number and pin and service type and service limits can typically be provided to the service provider from the received activation information. However, if the service is prepaid DSL, then the phone number corresponding to the DSL modem needs to additionally be provided by the user. At step 808, the user installs the prepaid software. At step 810 the software couples to the database of the service manager and provides the account number and user entered PIN of the prepaid disk. Then at step 812, the service manager sends the allotted service access time or amount to the prepaid software. If at step 814 no additional time is being purchased, then at step 822 the prepaid service software enables use of the service and monitors the use of the service. During this time the user may engage or disengage the service. Step 824 determines if the amount of service used exceeds the amount of prepaid service communicated at step 812. If so then service is terminated by inhibiting service operation using switch 711.

Preferably, the application user interface (UI) 720 is able to display the amount of prepaid service remaining 722. Thus, when the prepaid service is about exhausted, the user may purchase an additional prepaid service at the point of sale. If purchased, another prepaid service disk is purchased and activated at the point of sale at step 816. The activation is communicated to service manager at step 818. Step 820 communicates the additional service from the service manager to the switch 711 and service is maintained. A prepaid card may alternatively be used for the purchase of additional service in place of the prepaid disk.

Relative to the second embodiment, the embodiment of FIG. 7 and FIG. 8 has the additional advantage of providing prepaid software related service, including prepaid Internet service. Thus, a consumer need no longer purchase rights to utilize software in perpetuity. Rather, limited rights may be purchased at the point of sale without entering into a contract with the service provider. The point of sale also provides for the purchase of continued service. Furthermore, the activation of the initial disk when purchased and activation of the recharging disk or card serves as a deterrent against theft or other improper transfer from the point of sale and the PIN number acts as a deterrent against theft or other improper transfer from the purchaser.

In an alternate embodiment, the attributes of the PIN number may be eliminated while remaining within the scope of the invention. That is, a PIN may not be required to obtain the prepaid services. Also, the timer 514 or 714 and switch 511 or 711 may alternately be implemented at the service provider or distributed between the service provider and local personal computer while realizing the advantages of the invention.

According to the inventive principles as disclosed in connection with the preferred embodiment, the invention and the inventive principles are not limited to any particular kind of computer system but may be used with any general purpose computer, as would be known to one familiar with the art, arranged to perform the functions described and the method steps described. The operations of such a computer, as described above, may be according to a computer program contained on a medium for use in the operation or control of the computer, as would be known to one familiar with the art. The computer medium that may be used to hold or contain the computer program product, may be a fixture of the computer such as an embedded memory or may be on a transportable medium such as a disk, as would be known to one familiar with the art.

The invention is not limited to any particular computer program or logic or language, or instruction but may be practiced with any such suitable program, logic or language, or instructions as would be known to one familiar with the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Although a specific embodiment of the invention has been disclosed. It will be understood by those familiar with the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

Thus, what is provided is a method and apparatus that addresses the advantages of prepaid services while resolving the problems of providing services partially implemented on a personal computer and partially implemented on another networked computer.

What is claimed is:

1. A method of providing a service comprising a local process operating in conjunction with a local computer coupled through a computer network to a service provider process operated by a service provider, the method comprising the steps of:
   at a service manager, receiving an initial activation signal from a point of sale indicating
      a transfer of access rights to the service,
      a transfer of physical media including at least a portion of the local process, and
      an identification signal uniquely identifying the local process; and
   at the service manager, sending an authorization signal indicative of the identification signal to the service provider process, thereby facilitating the service by enabling communication between the local computer and service provider through the computer network.

2. The method according to claim 1 wherein the portion of the local process includes a switch for deactivating the service at the local computer and further wherein the local computer is coupled to the service manager through the computer network, the method further comprising the step of
   at the service manager, sending a switch control signal to the switch in response an amount of access rights to the service transferred, thereby facilitation service termination substantially independent of the service provider.

3. The method according to claim 2 wherein the service provider includes a switch process for deactivating the service at the service provider and the method further comprising the step of
   at a process manager, sending a second switch control signal to the service provider in response an amount of access rights to the service transferred, thereby facilitation service termination at the service provider.

4. The method according to claim 2 wherein the service is an Internet access service and the computer network includes the Internet.

5. The method according to claim 4 wherein the local computer includes a personal computer system coupled by a cable to an external modem for providing the Internet access service and the physical media included a device having the switch removably coupled to the cable wherein the method further comprises the steps of:
   receiving the switch control signal at the device; and
   at the device, decoupling the personal computer from the external modem in response to the switch control signal.

6. The method according to claim 5 wherein the device includes a timer for determining an amount of time the Internet access service is utilized by the personal computer system and the switch control signal includes an allotted time signal indicative of the amount of access rights to the service transferred and the method further comprises the steps of:
   at the device, comparing the amount of time the Internet access service is utilized by the personal computer system substantially with allotted time signal; and
   at the device, decoupling the personal computer system from the modem if the amount of time the Internet access service is utilized by the personal computer system substantially exceeds the allotted time signal.

7. The method according to claim 6 further comprising the steps of:
   at the device, sending a termination signal uniquely identifying the local process to the service manager in response to said step of decoupling; and at the device, sending a disconnect signal to the external modem in response to said step of decoupling, thereby terminating a broadband Internet service.

8. The method according to claim 2 wherein
the point of sale is included within a retail merchant receiving compensation from a purchaser for the transfer of access rights to the service and the transfer of the physical media for use at the local computer,
the service provider provides a plurality of services operating on a corresponding plurality local computers, and
the retail merchant, the service provider and the service manager are substantially independent business entities and the method further comprises the steps of:
at the service manager, receiving at least a portion of the compensation from the retail merchant; and
transferring from the service manager to the service provider compensation for the plurality of services provided by the service provider.

9. The method according to claim 2 further comprising the steps of:
at the service manager, receiving an additional activation signal from a point of sale indicating
a transfer of additional access rights to the service, and
a transfer identification signal uniquely identifying the transfer of additional access rights to the service;
at the service manager, receiving an association signal associating the additional activation signal with the initial activation signal; and
at the service manager, sending an additional switch control signal to the switch in response an amount of additional access rights transferred.

10. The method according to claim 1 wherein the portion of the local process includes computer instructions stored on a computer readable media, the computer instructions comprising instructions for a switch for deactivating the service at the local computer and further wherein the local computer is coupled to the service manager through the computer network, the method further comprising the step of
at the service manager, sending a switch control signal to the switch in response an amount of access rights transferred, thereby facilitation service termination substantially independent of the service provider.

11. The method according to claim 10 wherein the computer readable media further includes a portion of the local computer process and the service includes at least one of either Internet access service, a computer game service or a thin client service.

12. A method of regulating a service comprising a local process operating in conjunction with a local computer coupled through a computer network to a service provider process operated by a service provider, the method comprising the steps of:
at a service manager, receiving an initial activation signal from a point of sale indicating
a transfer of service access rights to the service,
a transfer of a physical media including at least a portion of the local process and a switch for deactivating the service at the local computer, and
an identification signal uniquely identifying the local process; and
at the service manager, sending a switch control signal through the computer network to the switch indicative of an amount of service access rights transferred, thereby facilitation service termination substantially independent of the service provider.

13. The method according to claim 12 wherein the transfer of service access rights and the transfer of physical include a purchase at a retail point of sale wherein consideration is contemporaneously exchanged for an ownership and possession of the service access rights and physical media.

14. The method according to claim 12 further comprising the steps of:
at a service manager, receiving a subsequent initial activation signal from a point of sale indicating
a transfer of subsequent service access rights to the service, and
a subsequent identification signal uniquely identifying the local process; and
at the service manager, sending a subsequent switch control signal through the computer network to the switch indicative of an additional amount of service access rights transferred, thereby facilitation service termination substantially independent of the service provider.

15. The method according to claim 12 further comprising the step of:
at the local computer, installing the of the local process and the switch
at the local computer, coupling to the service manager to receive the switch control signal;
at the local computer, determining an amount of service access rights utilized by the local computer;
at the local computer, coupling to the service provider process to utilize the service access rights if the amount of service access rights utilized by the local computer does not exceed the amount of service access rights transferred; and
at the local computer, terminating the service in response thereto if the amount of service access rights utilized by the local computer exceeds the amount of service access rights transferred.

16. The method according to claim 12 wherein the service includes presentation of audio or audio/video programs and the service access rights provide for a predetermined number of presentations.

17. The method according to claim 16 wherein the audio or audio/video programs include motion picture recordings and the computer network corresponds to the Internet, thereby providing for a prepaid movie ticket to view Internet enabled movies.

18. The method according to claim 12 wherein the service includes operation of software applications and the service access rights provide for a predetermined amount of time for use of the software applications.

19. The method according to claim 18 wherein the service provider process substantially entirely operates software applications and the local process operates substantially as a thin-client user interface process, thereby providing for prepaid thin-client software applications.

20. The method according to claim 10 wherein the service includes Internet service provision and the service access rights provide for a predetermined amount of time for use of the Internet service provision, thereby providing for prepaid Internet service provision.

* * * * *